US007660750B1

(12) United States Patent
Goodson et al.

(10) Patent No.: US 7,660,750 B1
(45) Date of Patent: Feb. 9, 2010

(54) VIEWING AND ORDERING CUSTOMIZED RESIN PANELS THROUGH WEB-BASED INTERFACES

(75) Inventors: R. Talley Goodson, Salt Lake City, UT (US); Jonathan M. Greene, Salt Lake City, UT (US); Jonathan C. Shurtliff, Centerville, UT (US); Benjamin S. Newbold, Murray, UT (US); Mac G. Newbold, Salt Lake City, UT (US)

(73) Assignee: 3form, Salt Lake City, UT (US)

( * ) Notice: Subject to any disclaimer, the term of this patent is extended or adjusted under 35 U.S.C. 154(b) by 494 days.

(21) Appl. No.: 11/760,525

(22) Filed: Jun. 8, 2007

Related U.S. Application Data

(60) Provisional application No. 60/804,416, filed on Jun. 9, 2006, provisional application No. 60/940,439, filed on May 28, 2007.

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| 3,306,956 | A | 2/1967 | Barnette |
| 4,459,470 | A | 7/1984 | Shlichta et al. |
| 4,722,158 | A | 2/1988 | Urdaneta |
| 5,291,395 | A | 3/1994 | Abecassis |
| 5,352,532 | A | 10/1994 | Kline |
| 6,331,858 | B2 | 12/2001 | Fisher |
| 6,352,784 | B1 | 3/2002 | Katagiri |
| 6,535,294 | B1 | 3/2003 | Arledge, Jr. et al. |
| 6,664,972 | B2 | 12/2003 | Eichel et al. |
| 6,715,423 | B2 | 4/2004 | Fujii et al. |

(Continued)

FOREIGN PATENT DOCUMENTS

EP 0888908 A2 7/1999

(Continued)

OTHER PUBLICATIONS

June Fletcher, Wall Street Journal. (Eastern edition). New York, N.Y.: Jan. 20, 2006. p. W.8; http://proquest.umi.com/pqdweb?did=972335761&sid=1&Fmt=3&clientId=19649&RQT=309&VName=PQD.*

*Primary Examiner*—Mila Airapetian
(74) *Attorney, Agent, or Firm*—Workman Nydegger

(57) ABSTRACT

A web-enabled resin panel customization website, hosted through a web portal, provides, through a client computer system, one or more user interfaces configured to receive a plurality of user selections, and provide a realistic display of the resulting output. In one implementation, a processing module overlays transparent portions of images representing a translucent resin substrate with one or more images representing decorative objects, films, or the like. The processing module can also combine pixel information from each of the added/overlain layers. In either case, the processing module sends a combined pixel data stream that can be rendered by a client system, and thus provide a user with a realistic depiction of the user's resin panel selections. The customization website further includes one or more user interfaces that enable a user to store specific resin panel design profiles, and order resin panels corresponding to those specific design profiles.

20 Claims, 8 Drawing Sheets

U.S. PATENT DOCUMENTS

| | | |
|---|---|---|
| 6,727,925 B1 | 4/2004 | Bourdelais |
| 6,835,948 B2 | 12/2004 | Woontner |
| 6,892,105 B2 | 5/2005 | Draughn et al. |
| 6,925,196 B2 | 8/2005 | Kass et al. |
| 6,991,830 B1 | 1/2006 | Hansson et al. |
| 7,003,364 B1 | 2/2006 | Hansson et al. |
| 7,072,733 B2 | 7/2006 | Magee et al. |
| 2002/0030689 A1 | 3/2002 | Eichel et al. |
| 2002/0052799 A1 | 5/2002 | Starikov |
| 2002/0069078 A1 | 6/2002 | Goldstein |
| 2002/0123941 A1 | 9/2002 | Donahue et al. |
| 2002/0128933 A1 | 9/2002 | Day et al. |
| 2003/0035917 A1 | 2/2003 | Hyman |
| 2003/0216972 A1 * | 11/2003 | Gotou et al. .................. 705/26 |
| 2004/0180193 A1 | 9/2004 | Oda et al. |
| 2004/0236634 A1 | 11/2004 | Ruuttu |
| 2005/0010495 A1 | 1/2005 | Shih et al. |
| 2005/0102151 A1 | 5/2005 | Fuwa et al. |
| 2005/0102199 A1 | 5/2005 | Lee |
| 2006/0287932 A1 | 12/2006 | Wulteputte et al. |

FOREIGN PATENT DOCUMENTS

| | | | |
|---|---|---|---|
| WO | WO2004033207 A1 | 4/2004 | |

* cited by examiner

VIEWING AND ORDERING CUSTOMIZED RESIN PANELS THROUGH WEB-BASED INTERFACES

CROSS-REFERENCE TO RELATED APPLICATIONS

The present invention claims the benefit of priority to U.S. Provisional Patent Application No. 60/804,416, filed on Jun. 9, 2006, entitled "Web-Based Custom Product Designing," and to U.S. Provisional Patent Application No. 60/940,439, filed on May 28, 2007, entitled "Web-Based Custom Product Designing With Translucent Film Effects." The entire contents of both of the aforementioned patent applications are incorporated herein by reference.

BACKGROUND OF THE INVENTION

1. The Field of the Invention

This invention relates to systems, methods, and computer program products for designing, customizing, or otherwise ordering materials through a computerized user interface.

2. Background and Relevant Art

Resin panels, such as panels made from copolyester, acrylic, polyvinyl chloride, and/or polycarbonate materials are now used in a wide range of environments where glass panels were used previously. In particular, resin panels can now be manufactured in a wide range of gauges and sizes, as well as in a wide range of colors, degrees of translucence, and with various ranges of both aesthetic benefits and structural rigidity. As a result, resin panels are now common place as a glass replacement for any number of aesthetic and functional ends. In particular, resin panels are often now used in an interior space anywhere glass may have been used, such as in a wall, ceiling, or floor structure, or in a simple room partition.

In general, resin panels tend to provide a number of benefits over glass, in that they tend to be more lightweight, tend to be less fragile, and also tend to be more flexible in how they are formed and used for different uses. In particular, the expense of forming or assembling resin panel structures tends to be far less than the expense of doing the same with glass. These and other features make it generally easier, and more cost-effective, to create certain decorative effects with resin panels, compared with glass. For example, there are now a wide range of ways in which a manufacturer will adhere one or more decorative image layers to one or more resin panels, such as by adhering a decorative surface treatment (color film or fabric) to an outside surface of a resin panel substrate. Additional ways include adhering these or other materials between two or more resin panels, which ultimately display the decorative image layer after thermoforming processes have been completed (i.e., due to the translucence of the resin panels).

In particular, resin substrates (i.e., resin sheets combined in a resin panel) tend to be easier to work compared with glass. This tends to be true for a variety of reasons, many of which stem from the common benefit that manipulation of resin substrates can be done at much lower temperatures and pressures than glass. The notion of lower temperatures and pressures, in turn, increases the numbers of decorative materials that can be used with decorative resin panels that are made using thermoforming techniques, and further improves the cost-effectiveness (compared with glass) for manipulating the decorative resin panels. In particular, the possible choices for decorative resin panels extend to a wide range of decorative image layer materials, such as natural or synthetic minerals, plants or plant fibers, fabrics, films, metals, etc. Furthermore, resin panels can be modified by color, and by degree of opacity or translucence in the resin panel substrates, in addition to any decorative textures or relief surfaces applied thereon.

Accordingly, it is common for customers (e.g., architects, designers) to be selective about specific combinations of resin panels and decorative materials, pursuant to creating an ultimate effect in an environment. In general, there are a number of ways for providing a customer with the ability to pick certain decorative objects and shapes for a given set of one or more resin panels. Conventional mechanisms include providing a paper-based catalog of previously manufactured/designed resin panels, or of certain colors, resin types, textures, decorative objects, and so forth that can be combined by the customer for a particular end product. In some cases, a manufacturer/supplier might even provide these sorts of materials on an internet website, and allow the customer to select and order visual representations of the materials using an electronic ordering form.

In general, the above-described mechanisms for providing a customer with choices, particularly with respect to paper catalogs, tend to be fairly time-consuming, and limited in terms of provided possibilities. For example, a manufacturer/supplier may need to first prepare a distinct image of each material and/or corresponding usage in a decorative resin panel. In some cases, the images may be image layers using the palate of variable design criteria offered by the sponsor of a website, while, in other cases, the images may be sketches thereof. The manufacturer can then place the image in a paper catalog, or post the image via the manufacturer's website. While this sort of process can work well for certain commonly-ordered resin panels or resin panel designs, this sort of process can be limited with customized resin panels.

For example, a customer might select polycarbonate panels with a wave-based relief surface, which uses pebbles as an interlayer and a light blue color film background. If the paper or web-based catalog showed this combination without the pebbles, without the blue color film, or without some other feature, the user might have difficulty envisioning how the resulting decorative panel should look when finished. Although there are computerized mechanisms that can show the effect of overlaying two different images (e.g., one color layer and another color layer), the number of factors involved with creating resin panel combinations can make the overall process daunting, especially given the possible number of design permutations.

Specifically, there are significant difficulties with correctly and realistically displaying through a computerized system the relatively endless possible combinations, and combinations of combined materials in a resultant resin panel, and in a way that are just as the materials would look when combined in real life.

BRIEF SUMMARY OF THE INVENTION

Implementations of the present invention provide systems, methods, and computer program products configured to provide customers with the ability to customize, view, and purchase decorative architectural resin panels through one or more internet-based websites hosted at one or more web portals. In one implementation, for example, a user selects a plurality of different materials, at least some of which are transparent or translucent, and at least some of which include opaque, or colored materials. The one or more web portals, in turn, can combine the user selections to create a data stream that represents a realistic view of the customized resin panel, regardless of selected materials, and can further indicate to the user when an ultimate combination or end-product is unavailable or impossible. The one or more web portals can then facilitate purchase of the customized resin panel.

For example, a method from the perspective of a user at a client computer system can involve selecting through a client computer system one of a first set of resin panel options displayed through a resin panel customization website hosted at a remote web portal. The selected first option is displayed through the customization website. The method can also involve selecting through the client computer system one of a second set of resin panel options displayed through the customization website. The selected second option is displayed completely behind or in front of the selected first option.

In addition, the method from the perspective of the user can involve receiving rendering information from a remote web portal that reflects a combination of the selected first and second options when displayed. Furthermore, the method can involve displaying one or both of the selected first and second selected options in an at least partially transparent manner. As such, at least a portion of both the first and second selection options are displayed at the same time even though completely overlain together.

By contrast, a method from the perspective of a website (i.e., a website hosted at a web portal) can involve receiving from a client computer system one or more user selections through a resin panel customization website regarding one or more resin panel options. The method from the perspective of the website can also involve receiving from the client computer system one or more user selections through the customization website regarding one or more decorative image layer options that are to be completely overlaid in front of or behind the selected one or more resin panel options.

In addition, the method from the perspective of the website can involve processing, at a web portal, a combined data stream that combines pixel values for the one or more resin panel options and for the one or more decorative image layer options. In this data stream, both the one or more decorative object images and the one or more resin panel substrate images are viewable when the combined data stream is displayed. Furthermore, the method from the perspective of the website can involve sending the combined data stream of the combined pixel values from the web portal to the client computer system for a first display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and computer program products configured to provide customers with the ability to customize, view, and purchase decorative architectural resin panels through one or more internet-based websites hosted at one or more web portals. In one implementation, for example, a user selects a plurality of different materials, at least some of which are transparent or translucent, and at least some of which include opaque, or colored materials. The one or more web portals, in turn, can combine the user selections to create a data stream that represents a realistic view of the customized resin panel, regardless of selected materials, and can further indicate to the user when an ultimate combination or end-product is unavailable or impossible. The one or more web portals can then facilitate purchase of the customized resin panel.

In general, and as will be understood more fully from the following specification and claims, these and other features can be accomplished at least partly based on the way in which images are combined with transparent or translucent effects.

At least one implementation for combining images with transparency effects, for example, involves combining pixel values where at least some of the images are rendered as a transparency blank (e.g., using alpha channels) in advance. In other cases, a processing module combines the pixel values of each different image selection to create a new pixel value for the given pixel address, which provides another way to create a transparency/translucence effect. In either case, a processing module sends a combined pixel data stream back that represents a realistic portrayal of the user selections in combination.

Figure 1A:
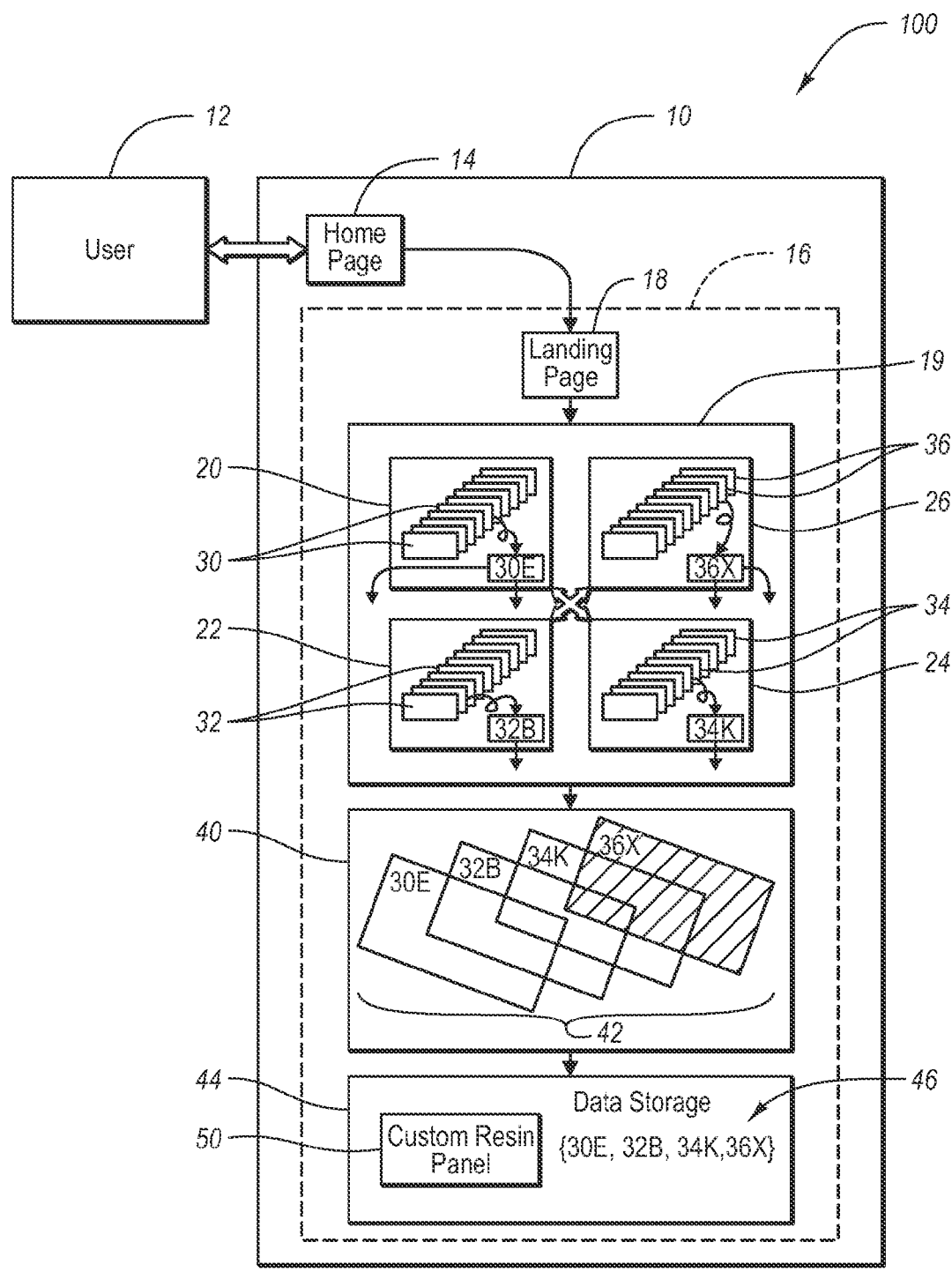
FIG. 1A illustrates an overview schematic diagram of a system in accordance with an implementation of the present invention in which a user designs and views custom resin panels through one or more web-based resin panel customization websites.

Referring now to the Figures, FIG. 1A depicts a schematic diagram of one implementation of a generalized system 100 for processing user selections for a customized resin panel through one or more web portals hosting one or more resin panel customization websites 10. For example, FIG. 1A illustrates a resin panel customization website 10 configured to enable a user 12 to interact therewith and develop a design for a customized resin panel (e.g., 50) used in one or more architectural design or general construction settings. Along these lines, FIG. 1A shows that, upon first encountering and entering website 10 through the internet, user 12 arrives at a home page 14 (of website 10), which presents to the user various, selectable options.

At least one of these options is to enter a custom design portion 16, wherein the user can develop and order (for manufacturing) a customized product (i.e., resin panel) design. Upon selecting design portion 16, user 12 arrives first at a landing page 18, which provides user 12 with an overview of the custom designing process. By advancing to a design criteria library 19, user 12 can view a palate of variable, visible resin panel criteria, which the user 12 can choose for incorporation into a custom resin panel design. In one implementation, for example, design criteria library 19 includes a first variable visible resin panel criterion 20, a second variable visible resin panel criterion 22, a third variable visible resin panel criterion 24, and a fourth variable visible resin panel criterion 26. Each variable, visible resin panel criteria 20, 22, 24, 26, in turn, is an image (e.g., a photograph) that visually represents the available products/materials that can be combined in a customized resin panel.

For example, first variable visible resin panel criterion 20 can encompass a number of first visible resin panel sub-options 30, such as one or more classes of resin panel substrate textures. Selection of any of the sub-options 30, results in a visible display of corresponding additional sub-options that are selectable (e.g., via a scrollable mechanism) to the side of panel criterion 20. In one implementation, each of these scrollable resin panel options is displayed in effectively transparent portions in front of a neutral background, except that the transparency/translucent effect is modified to show shading, texturing, or other forms of surface treatment on the resin substrate. As will be understood more fully herein, the effective transparence of each displayed panel option allows the user 12 to see any other image(s) positioned electronically behind the selected, textured (or treated) resin panel substrate. In this example, FIG. 1A shows that user has selected option 30E.

In addition to a selection for criteria 20, the website 10 also provides user 12 with a view (e.g., via direction from design criteria library 19) of another of the variable visible resin panel criteria 22. In one implementation, for example, criteria 22, encompasses a number of second visible resin panel options 32, such as one or more decorative resin panel interlayers, or classes of decorative interlayers. When one of the options/classes 32 is selected, the website 10 displays each of the visible resin panel options in that particular class 32, such as in a set of scrollable display options showing transparencies of the image layer in front of a neutral background. That is, each selectable panel option may also be a transparency (at least in part), such as with options 30, except where exhibiting the features of some decorative object (e.g., thatch reed, leaves, pebbles, glass, etc.) in the forefront. In this example, FIG. 1A shows that user 12 has selected resin panel option 32B.

The above-described options and sub-options can be applicable for as many other resin panel product options that are combinable per the manufacturer. For example, the website 10 may further provide options 24 and 26, with corresponding sub-options, or classes of sub-options, 34, and 36. In one implementation, options 24 and corresponding sub-options 34 may represent one or more colors, or classes of colors, that can be used in a resin panel product. Similarly, options 26, and corresponding sub-options 36, may represent other forms of surface treatment, or even molding, shapes, gauges/thicknesses, height/width dimension, surface covering, primer under-coatings, color films (or multiples thereof) or the like, of the ultimate resin panel end product. As with sub-options 30 and 32, the website 10 may display the sub-options 34 and 36 as sets of scrollable, selectable displays to the side of a pull-down menu. In any case, FIG. 1A shows that the user has selected corresponding sub-options 34K and 36X.

In one implementation, such as upon receiving any or all such user selections, the website 10 can prepare a virtual visual stack 42, such as in collation section 40. In virtual visual stack 42, website 10 superimposes specific first visual resin panel option 30E before specific second visual resin panel option 32B, and specific second visual resin panel option 32B before specific third visual resin panel option 34K. In these case, all selected options are stored in transparency format, so that options 30E, 32B, and 34K are all visible to some degree, despite the overlay. These particular options may even further be overlaid over a final option 36X. If opaque, specific fourth visual resin panel option 36X will generally be the bottom layer in virtual visual stack 42, and will thus ultimately be viewable through each of the panel options 30E, 32B, and 34K, depending on the level/degree of transparency n the other selections.

Of course, one will appreciate that, in most cases, the displayed/scrollable options will all be the same size and dimension when projected in a test area (e.g., as panel 50) on the website. For example, choosing a textured polycarbonate resin panel can result in a display on the website 10 test area of a 2"×3" image. When further selecting a decorative image layer option, the website 10 test area will be changed to have another 2"×3" decorative image layer image positioned behind the textured resin panel image. Since the decorative image layer image and the textured resin panel layer image are exactly the same size, the decorative image layer image will typically be completely overlaid in front of or behind the resin panel image, as appropriate.

FIG. 1A further shows that the website 10 can store the virtual resin panel stack 42 in a data storage section 44. Specifically, the details of resin panel 42 can be further stored in a custom resin panel profile 46. That is, the customized resin panel (or virtual visual stack) 42 reflects a set of specific visual resin panel options "{30E, 32B, 34K, 36X}" that can be retrieved at any subsequent point as needed. For example, through a polling of data storage section 44, and by reference to the variable visual resin panel criteria in design criteria library 19, custom resin panel design profile 46 can be recreated at will, either by user 12 or by the sponsor of website 10. Because of the storage efficiency of the data embodied in resin panel design profile 46, that data can easily serve as a resin panel identification code, which can be used in all commercial and functional activities of the sponsor of website 10.

In any event, and perhaps more importantly, website 10 is able to render the virtual visual stack 42 in an image of the resultant, customized resin panel image 50. In particular, resin panel customization website 10 creates a combined data stream that is viewable on the user 12 computer display, which shows how the ultimate resin panel will look when the selected options 30E, 32B, 34K, and 36X are combined together. As a result, user 12 can immediately determine if the resulting, resin panel end product (e.g., 50) is what would be desired in a particular environment, without having to order physical samples of each possible permutation of options 30, 32, etc. This is at least partly since the user can easily and quickly experiment with changes in orientation of the panel (to view front and back perspectives), as well as to change interlayers, color film layers, backing layers, texture layers, etc.

In addition, implementations of the present invention can further be configured to indicate to a user when a particular set of design selection permutations would not be available. In at least one implementation, for example, website 10 can check data in collation section or storage 40 against a reference library, to allow identification of whether a resin panel embodying that set of custom resin panel data is actually capable of being manufactured (e.g., material availability, size of available materials, etc.) using the manufacturing processes. If a resin panel embodying a given set of custom resin panel data cannot be produced for technical or supply reasons, then that determination can be communicated to user 12 at the time the proposed set of custom resin panel data is selected by user 12. User 12 can then be redirected by custom design portion 16 of website 10 to make another set of selections for possible manufacture as a custom product. Of course, along similar lines, user 12 may also simply change selections through design criteria library 19 until satisfied with the resulting end product 50.

Figure 1B:
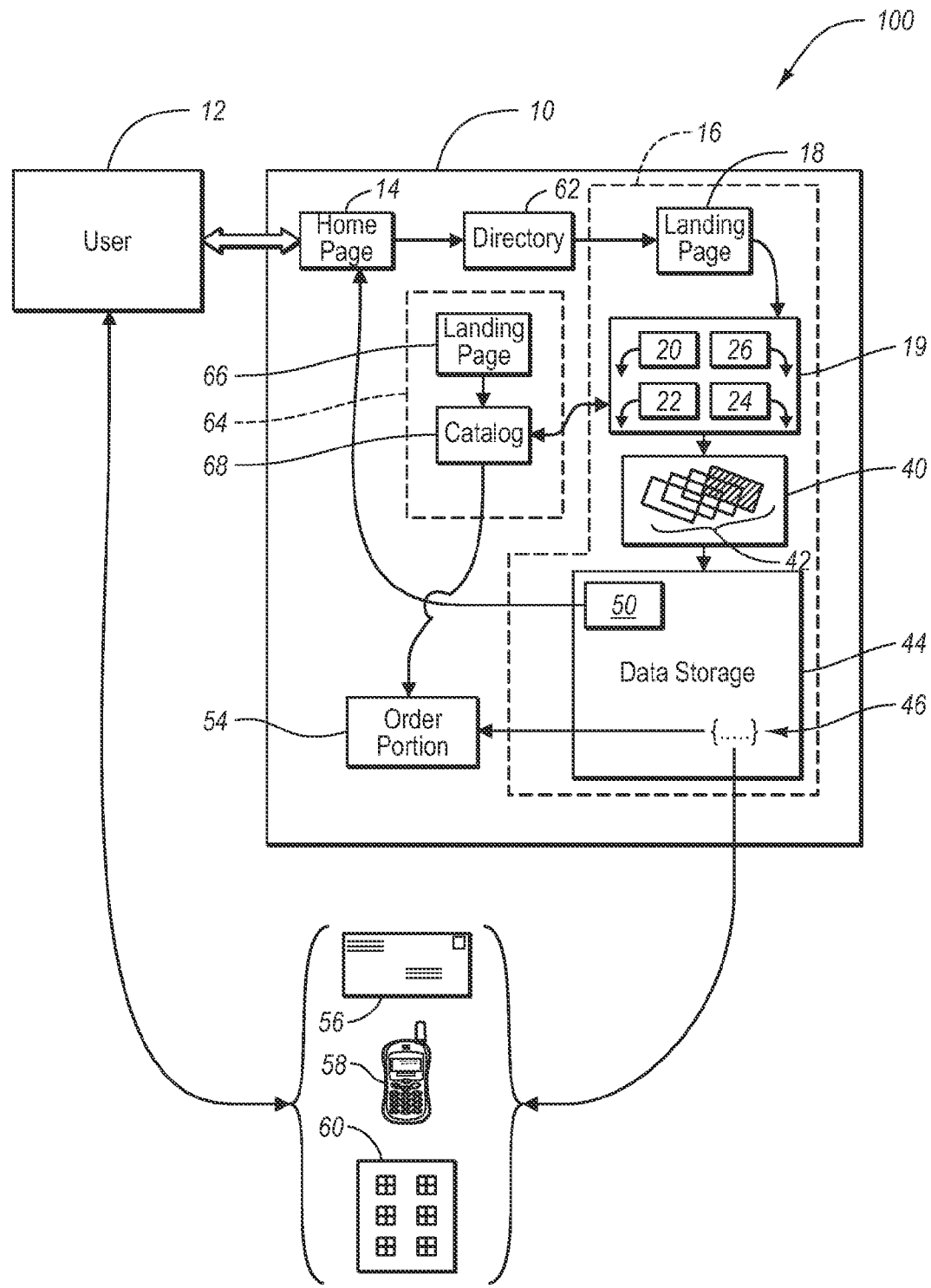
FIG. 1B illustrates an overview schematic diagram of the system of FIG. 1A in which the user executes one or more orders of the designed and/or viewed resin panels.

Upon creating a satisfactory combination of options, user 12 can then purchase the resulting end panel. For example, FIG. 1B illustrates a schematic diagram in which user 12 engages in one or more purchasing interactions with website 10. In particular, FIG. 1B illustrates an implementation in which user 12 purchases one or more resin panels based on the data saved in data storage section 44 (e.g., profile 46 "{30E, 32B, 34K, 36X}"). For example, user 12 could direct custom design portion 16 to communicate to an order portion 54 of website 10 a request to purchase samples or supplies of the customized resin panel 50, which is represented by custom resin panel profile 46. Alternatively, custom resin panel profile 46 could be used by representatives of the sponsor of website 10 as a basis for negotiating purchases through postal channels 56, by telephone 58, or in face-to-face encounters at an office 60.

It is generally rare that all products offered by a commercial entity will be of the custom design variety. It is expected in at least some cases, therefore, that website 10 can also present to user 12 the option to select for purchase items of stock products. Accordingly, FIG. 1B also illustrates directory 62 for website 10, which is interposed between home page 14 and custom design portion 16. In one implementation, directory 62 provides user 12 with the opportunity to, instead of entering custom design portion 16, visit a stock resin panel portion 64 of website 10. For example, user 12 can select stock resin panel portion 64, arriving first at a landing page 66. Landing page 66, in turn, can provide user 12 with an overview of the process of ordering stock products, as well as the nature of available selection of stock products (e.g., via stock resin panel catalog).

FIG. 1B further shows that the decisions by user 12 can be routed by website 10 to order portion 54. Order portion 54 thus serves as a common conduit for purchases and follow up marketing activities related to both custom design portion 16, and stock resin panel portion 64. In one implementation, stock resin panel catalog 68 contains mere listings of stock resin panel profiles; and corresponding resin panel images selected by client 12 can be assembled in stock resin panel catalog 68 through automatic communications with design criteria library 19 in custom design portion 16 of website 10. In this manner, custom design portion 16 of website 10 supports activities conducted through stock resin panel portion 64 as well.

Figure 2:
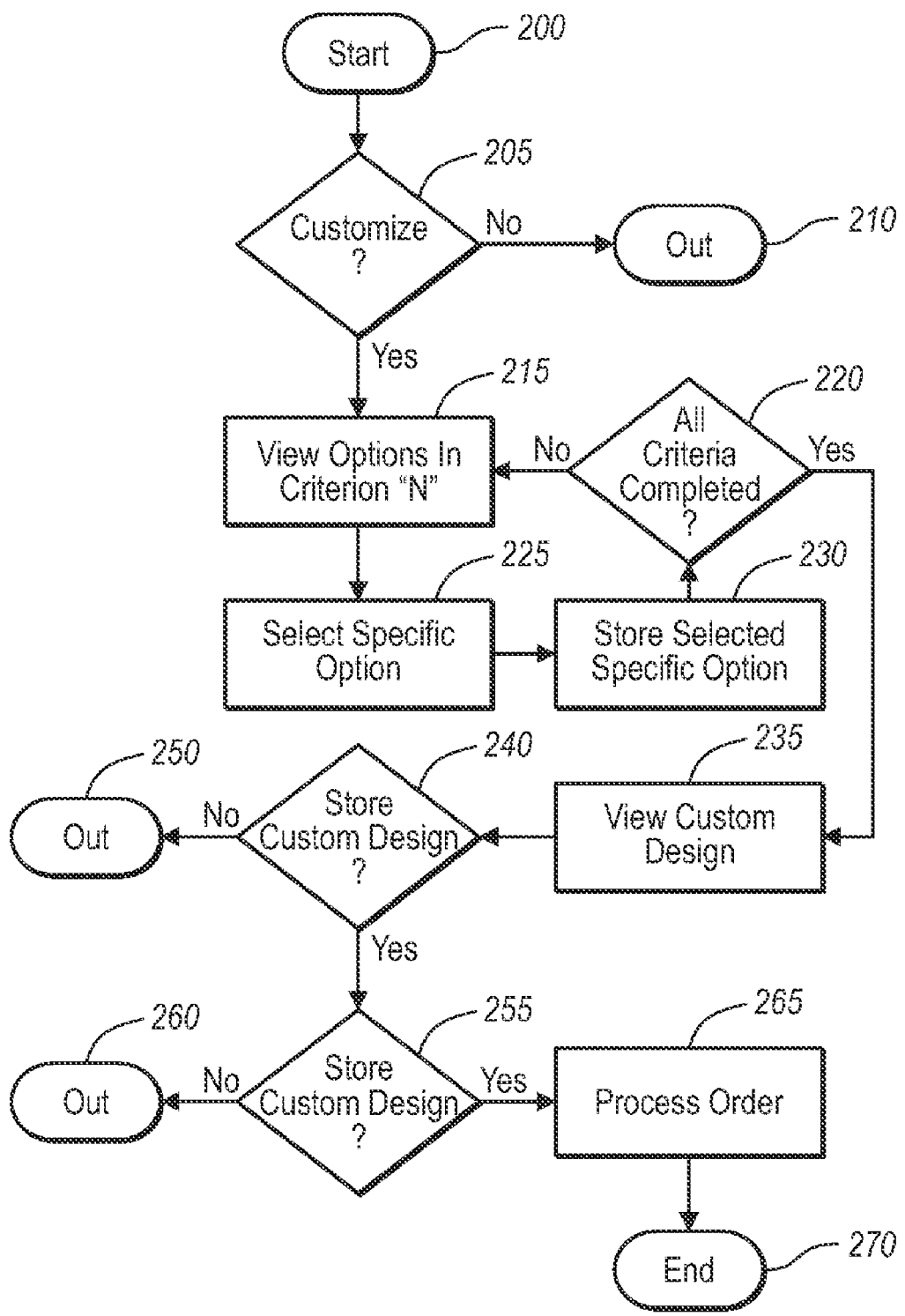
FIG. 2 illustrates a flowchart of steps in a method in accordance with an implementation of the present invention for developing and using a design for a customized resin panel using the one or more web-based user interfaces of FIGS. 1A-1B.

FIG. 2 illustrates at least one implementation of a series of steps in a method undertaken by user 12 in interacting with website 10 to design a custom resin panel. For example, FIG. 2 shows that the method comprises a beginning step 200, such as when the user first initiates resin panel customization website 10 and is provided with a set of options. In addition, FIG. 2 shows that the method comprises a "customize" step 205, in which the website 10 provides the user with an option to move into a resin panel configuration routine (or to use a resin panel "configurator"). Along these lines, FIG. 1A shows that website 10 can display four variable design criteria that may require resolution/selection by user 12. Of course, one will appreciate that more or fewer criteria of resin panel design are possible. For example, more criteria might be likely if some variable resin panel criteria are non-visible, or if variable visible resin panel options are multidimensional. Furthermore, some criteria can be duplicated in one or more ways to add multiplied effects, for example to make new colors by adding multiple color films.

In any event, if the user prefers not to customize a panel, the user 12 is directed along internet links in step 210 that do not allow for customization. If preferring customization, however, FIG. 2 shows that the user 12 goes through steps 220, 225, and 230 of viewing and selecting all required options until the system has received enough information (i.e., step 220 is satisfied for "yes"). If the criteria are satisfied, website 10 is configured to perform step 235 of providing a view of the custom design, and further provide the user with an option 240 to store the design. If the user prefers not to store profile 46, the website 10 directs user 12 via step 250 to exit the customization portion.

If preferring to store the design, the website 10 directs user 12 to another option 255 requesting whether user 12 desires to purchase the stored design. If the user would like to purchase the stored design, the user is directed via steps 265 and 270 to purchase and exit the system. Alternatively, if the user would not like to purchase the customized design, the user 12 is directed via step 260 out of the customization portion.

Figure 3:
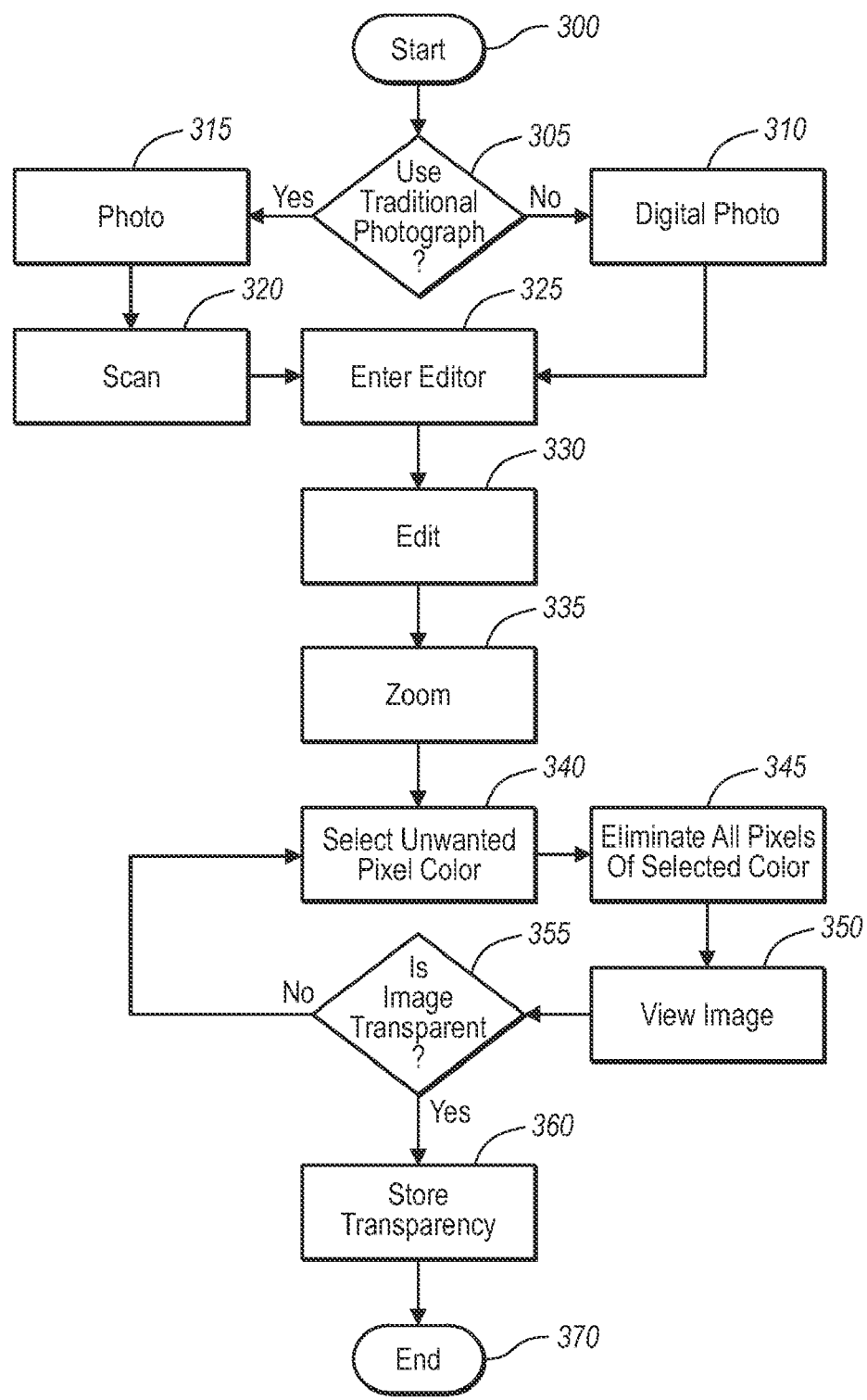
FIG. 3 illustrates a flow chart of steps in a method in accordance with an implementation of the present invention for preparing one or more images used to ultimately depict a customized resin panel design.

FIG. 3 illustrates a flow chart in accordance with an implementation for creating a transparency (e.g., of a transparency "blank"/"template") of a given design image. For example, FIG. 3 shows that the method can comprise a developer (e.g., designer/manufacturer/owner corresponding to website 10) taking steps (e.g., 300, 305) to obtain an electronic photograph of an image. In one implementation, the developer may need to implement steps 305, 315, and 320 of taking a photograph of a given material in isolation (i.e., not combined with another material, and against a neutral background), and create an electronic form of the photograph.

For example, the developer takes a photograph of an actual resin panel that embodies a given specific option within a variable design criterion. This same photograph can also be used in the development of transparencies corresponding to each other specific option for each other variable design criterion embodied in the resin panel photographed. The photograph is then converted by visual scanning into an electronic image comprising a two-dimensional array of data-laden pixels. The developer may alternatively receive a digital photo/scan of the material via step 310 from another source.

In addition, FIG. 3 shows that the developer can begin editing processes, such as via steps 325, 330, and 335. For example, the developer may need to crop any edges, and/or create a transparency of the given electronic image file. To convert the edited electronic image into a transparency, the developer may perform steps 340, 345, 350, 355, 360, and 370, as discussed below. In particular, the developer may first need to process the image repeatedly on a pixel-by-pixel level (340, 345) to remove all pixels bearing data that is not determinative of the appearance of the specific option for which the depicting transparency is being prepared. For example, image layers (e.g., layers of pebbles, fabrics, twigs, etc.) are processed so that all non-image portions of the layer (i.e., holes in the fabric, air between pebbles/twigs, etc.) are zoomed in and erased to create "alpha channels" (see FIG. 5A).

With other images, such as color films, creating a transparency simply involves zooming in on the corresponding image, and selecting a pixel of color that is irrelevant to depicting the option of concern. The developer can then delete all (or any) pixels with the unwanted color content from the image through automated image processing. The developer can continue to repeat this process of selecting and removing pixels of irrelevant color content until the resulting image is sufficiently transparent/translucent. The result is a transparency image, or a "transparency blank"/"template" of the original image.

Furthermore, the developer can go through this process of creating a transparency for all images, or only select images corresponding to certain image layers. For example, the user may desire to leave strictly opaque layers with no transparency processing, so that every pixel of an opaque layer will show through another transparency layer of another image. In any event, when finished creating the transparency, FIG. 3 shows that the developer can perform steps 360 and 370 of storing the transparency for access through website 10.

Figure 4:
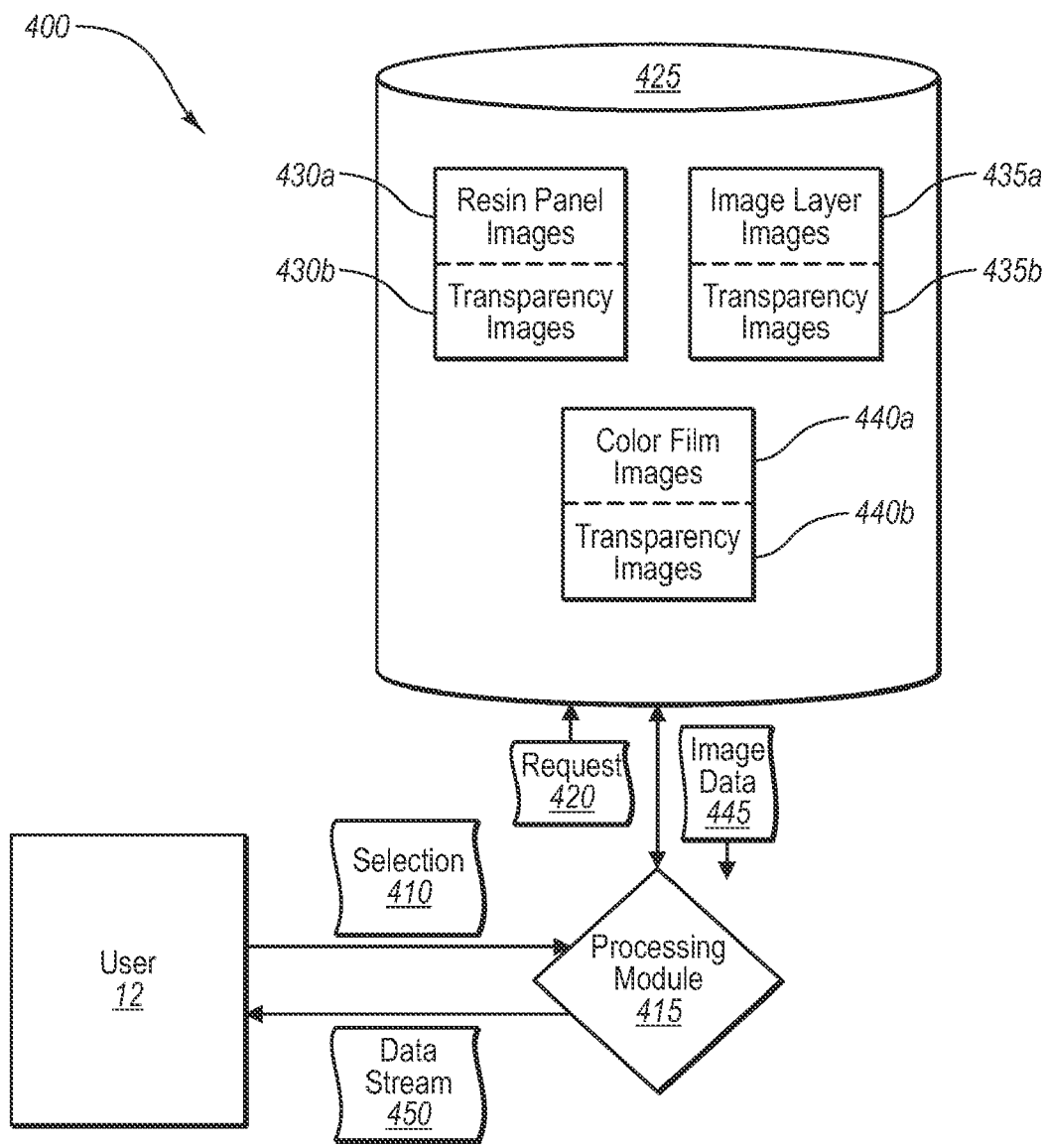
FIG. 4 illustrates an architectural schematic diagram of a system for processing one or more user resin panel design requests as a representative data stream.

FIG. 4 illustrates an architectural schematic diagram of a system 400, such as for use with resin panel customization website 10, in which user selections for a customized resin panel are processed as a representative data stream. In particular, FIG. 4 shows that user 12 sends one or more user selections 410 to one or more processing modules 415. For example, user 12 selects one or more textures, one or more resin compositions, one or more color film layers, one or more decorative interlayers, and/or one or more colored backing layers. User 12 may further select any other dimensional information regarding thickness gauge, numbers of different panel, image, or other layers, for any desired effect. Each of these selections, in turn, can be sent via one or more messages 410 to processing module 415.

Processing module 415 can comprise any server or even client-side instructions that, when executed, cause a corresponding computer system processor to process computerized instructions associated with message(s) 410. As shown in FIG. 4, for example, processing module 415 identifies from selections 410 that user 12 desires a given resin panel with a particular texture and color. Processing module 415 then requests the corresponding image data from data store 425.

For example, FIG. 4 shows that processing module 415 can send one or more requests 420 for data 430*a*, 435*a*, and/or 440*a* corresponding to resin panel images (e.g., textured/non-textured forms), image layer images, and/or color film images, respectively.

In response, FIG. 4 shows that processing module 415 receives one or more messages 445 comprising image data. For example, the one or more messages 445 can include transparency blanks in stores 430*b*, 435*b*, and 440*b* of images corresponding to resin panels 430*a*, image layers 435*a*, and/ or color film images 440*a*, respectively. As previously described, the processing module 415 can then arrange the various transparency images/blanks, as appropriate, so that they are viewable in a realistic form to the user. For example, the processing module 415 can create a virtual stack (e.g., 42) by positioning a textured resin panel transparency image (i.e., a transparency "blank" in store 430*b* of the normal image stored in 430*a*) on top of a transparency of an image layer image (i.e., a transparency "blank" of the image from store 435*b*), which is further on top of a color film image (i.e., a transparency "blank" of the image from store 440*b*). The processing module 415 can then send a data stream 450 representing the rendering information for this combination of images/image layers.

In additional or alternative implementations, however, processing module 415 can receive image data 445 in the form of pixel address information and corresponding RGB (red, green, blue) values from stores 430*a*, 430*b*, and/or 440*a*. In particular, FIG. 4 can receive pixel address and pixel value information for each pixel of any one or more given resin panel images, any one or more given image layer images, and/or any given one or more color film images selected by user 12. Processing module can then combine the received pixel information for each given image with pixel information from the next image in the virtual stack 42, much like pixels are combined in the example using alpha channels, except in this case to multiply and divide pixel values to create new pixel values in a new image (discussed more fully in FIG. 5C). As with the previous example, however, the net effect is the same (potentially even more realistic, such as with added color films), and the processing module 415 sends the rendering information for the resultant resin panel (e.g., 50) display as data stream 450.

Figure 5A:
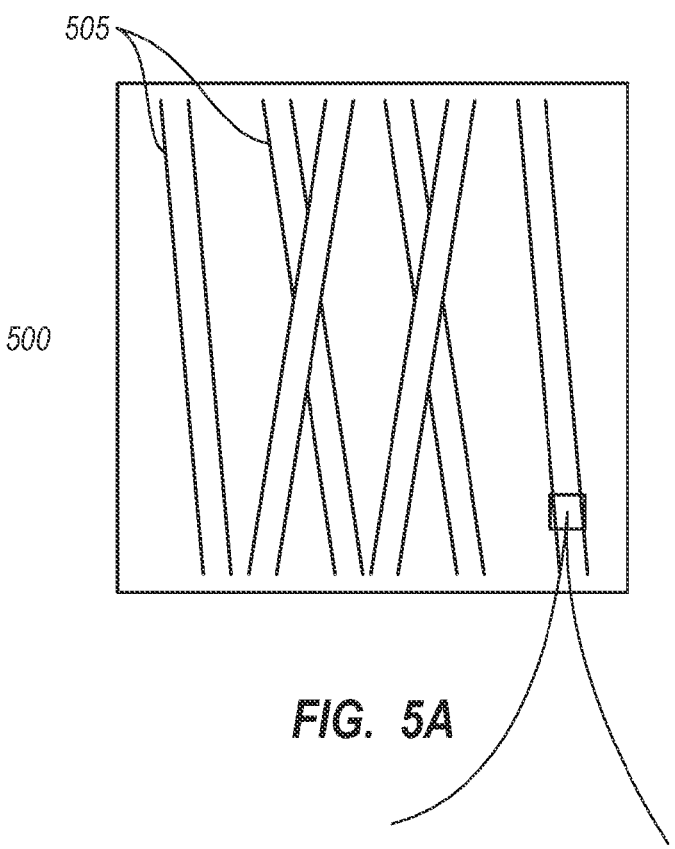
FIG. 5A illustrates an implementation of the present invention in which a customized resin panel is displayed on a graphical user interface, the displayed resin panel representing a combination of different user selections of resin panel material.
Figure 5B:
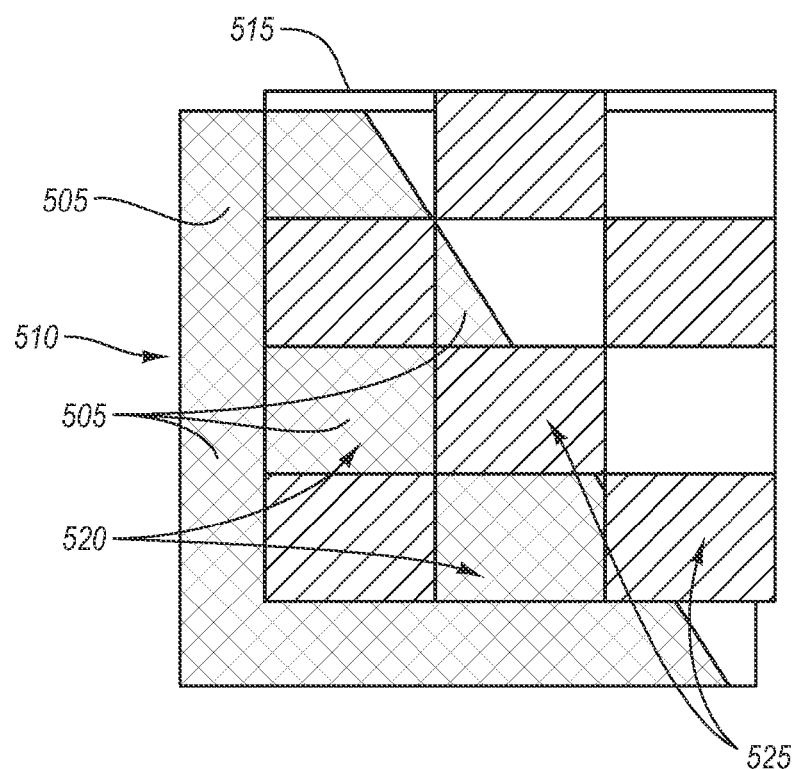
FIG. 5B illustrates an exploded view of a subset of pixels used in the rendering of the resin panel shown in FIG. 5A, in which the subset of pixels are configured to represent transparency effects using one or more alpha channels.

FIGS. 5A-5B illustrate more detailed schematic diagrams regarding the use of transparency images, and, in particular, an implementation of the present invention in which transparency-based images are overlaid with each other. For example, FIG. 5A illustrates that a resin panel created by a user 12 through website 10 can comprise a panel 500 in which are displayed a set of one or more decorative objects 505 in an underlying decorative image layer. FIG. 5B, in turn, illustrates an exploded view of a zoomed in portion of some of the pixels used in the display rendering of FIG. 5A.

In particular, FIG. 5B shows that customized resin panel 500 (e.g., see also panel 50) comprises a plurality of overlain image layers 510 and 515. For example, image layer 515 comprises a textured, transparent form of a resin panel substrate, while image layer 510 comprises the viewable image of a decorative image layer, such as the pixels in a photograph of a set of decorative objects used as an interlayer between two resin panels in a thermoforming process. FIG. 5B further shows that, at the pixel level, only some of the pixels for image 515 are transparent portions representing "alpha channels," while other pixels are opaque. For example, FIG. 5B shows that at least pixels 520 are transparent alpha channel pixels, while at least pixels 525 are at least partly opaque.

Thus, when overlaid together, the transparent, or alpha channel, pixels 520 of image layer 515 simply reveal the underlying pixel data corresponding to decorative object 505 image portions. In contrast, the opaque portions 525 (e.g., representing coloration, or texturing) of image layer 515 are prominent above any other pixel corresponding to decorative object 505 image portions. Of course, other layers may be positioned above or beneath images 510 and 515, which can result in further additive visual effects for the resulting resin panel (e.g., 50, 500), depending on their positioning on top of other pixels, or relative to a given alpha channel pixel. In such a case, therefore, the non-decorative image 505 portions of image layer 510 will generally be transparent (not shown), so that a decorative color film (or other colored backing layer) could be shown to effectively bleed through the corresponding alpha channels of image layer 510 that are also aligned with the transparent alpha channels 520 of image 515.

As previously mentioned, creating a transparency for any given image will typically require a developer to create alpha channel pixels in a given image at the pixel level. Although these alpha channels can be created automatically, by creating an even distribution of transparent alpha channel pixels throughout a given image layer, this can also be fairly time consuming. In particular, and even when using automated processes, creating a transparency blank of images that have decorative images layers or textures that need to be accommodated can be fairly difficult, particularly when needing to create transparencies around complex patterns. Furthermore, combining transparencies of some image layers may not look entirely realistic in all cases, and can depend heavily on the skill in creating a precise transparency blank.

Figure 5C:
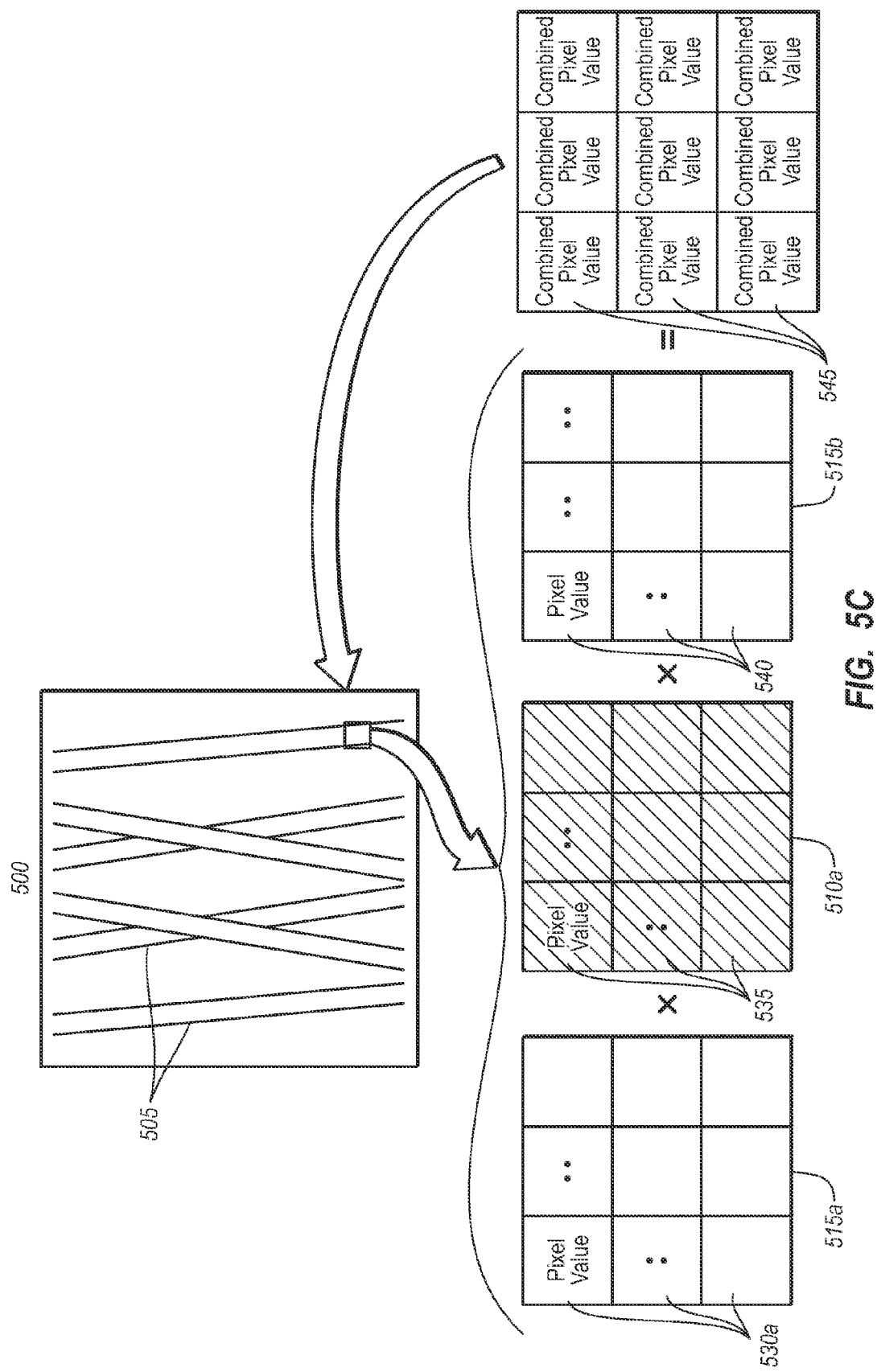
FIG. 5C illustrates another implementation for rendering the resin panel shown in FIG. 5A in which transparency effects are produced without necessarily using alpha channels.

Accordingly, implementations of the present invention further comprise mechanisms for implementing image layer combination data streams. As will be appreciated more fully herein, these combination data streams effectively provide the same effects as transparencies, but, at least in some cases, on a more efficient, realistic basis. In many cases, these methods can even provide a more realistic effect, especially when combining multiple color films together, or trying to gauge a difference in color or intensity effect, depending on the given side viewed (e.g., the number of color films against another decorative object image layer may be greater on one side of the image layer than on another side of the decorative object image layer). For example, FIG. 5C illustrates another implementation for rendering the resin panel shown in FIG. 5A in which transparency effects are produced without necessarily using alpha channels. In particular, FIG. 5C illustrates the same resin panel 500 which displays a set of one or more decorative objects 505.

In addition, FIG. 5C shows that resin panel image 500 can be created through a multiplied/divided combination (albeit still a "combination") of pixel values in corresponding layers selected by user 12. For example, FIG. 5C shows that a set of pixels in image 500 can be a result of a set of image layers 515a, 510a, and 515b, which have been combined on the pixel level using one or more mathematical, multiplication formulas (rather than simply adding by superimposing images). In particular, FIG. 5C shows that translucent or transparent bottom layer 515a which has pixels 530a all of a particular first RGB value (e.g., "0, 0, 0"). By contrast, image layer 510a, which comprises the zoomed-in portion of the decorative object 505, comprises a set of pixels 535, each of which has its own RGB pixel values. Similarly, FIG. 5C shows that user 12 has selected an upper image layer 515b, which has its own set of pixels 540 and corresponding pixel values.

Notably, none of these pixels 530a, 535, and 540 contain a transparent "alpha channel," as such, but rather an RGB value regarding what is contained inside the pixel. In this implementation, therefore, when requested to create rendering information for image 500, processing module 415 receives the addresses for each of these pixels 530a, 535, and 540 in one or more messages 445. Processing module 415 then combines these individual pixels values on an address-by-address basis to create a new, combined pixel value for each address. In one implementation, this simply involves multiplying each individual R, G, and B value for each pixel address, and dividing each such value by 255 to create a new RGB value.

For example, an implementation in which one image layer having an RGB value of 209, 35, and 60 is combined with another image layer having an RGB value of 80, 109, and 200, results in a new image layer having an RGB value of 65.56, 14.96, and 47.06. This end value of 65.56, 14.96, 47.06 can of course be further modified by combination with additional image layers. As such, one can appreciate that this new value will necessarily take into account the additive effects of multiple color films that are overlain with various opaque and transparent image layer portions, since the additive effect is for all layers on a pixel by pixel basis. Processing module 415 can then send the combined RGB data for each pixel directly to a user's display (or corresponding computer system) via one or more data streams 450. In some cases, processing module can also perform any additional processing on each set of combined pixel information points, such as by converting the pixel data into hexadecimal data.

Accordingly, combining pixels in this manner can provide a more useful, easier display/rendering mechanism where many multiples of image layers are used, without having to necessarily create special transparencies for each given image used in a virtual stack 42. In particular, combining pixel values for each image together in this manner results in an image that can better, or more realistically, take into account changes in color intensity, hue, or warmth (e.g., by combining multiple color films together), which may not always be visible by combining transparency images (e.g., FIGS. 1A-1B).

Figure 6:
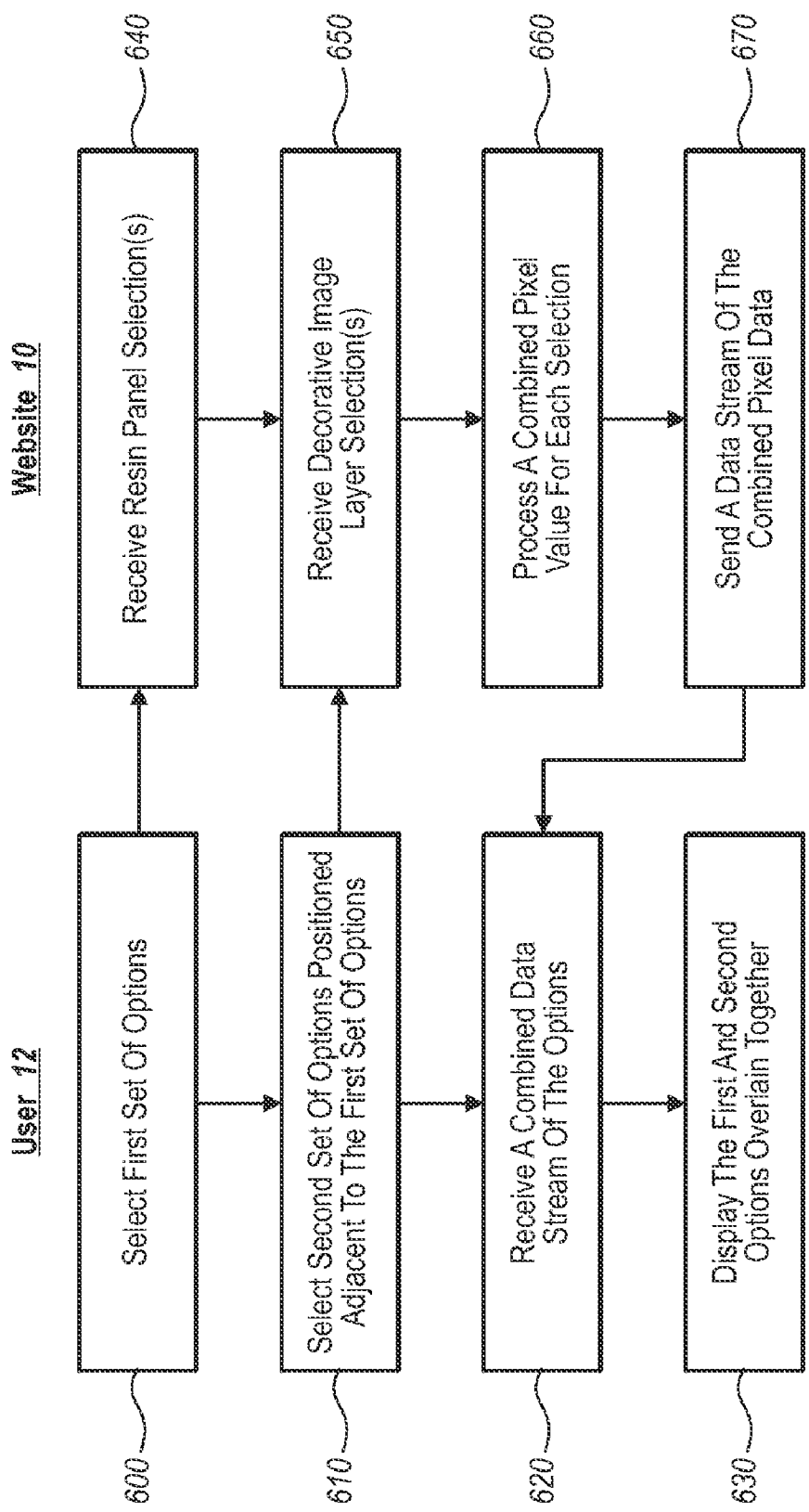
FIG. 6 illustrates a flowchart of a method from the perspective of a user and of a website in accordance with an implementation of the present invention for customizing a resin panel through a customization website, and displaying a combined data stream representing the customized resin panel.

Accordingly, FIGS. 1A-5C provide a number of schematics and mechanisms not only for user customizations of resin panels, but also for processing various user selections into a realistic display. In addition to the foregoing, FIG. 6 illustrates a flowchart of methods from the perspective of a user using a client computer system, and from a web portal hosting a website for selecting and creating a combined data stream representing a customized resin panel display based on a plurality of user selections. The acts of FIG. 6 are described below with respect to the components and diagrams of FIGS. 1A-5C.

For example, FIG. 6 shows that a method from the perspective of user 12 for interacting with the one or more websites to design a realistic display of user design choices can comprise an act 600 of selecting a first set of options. Act 600 includes selecting through a client computer system one of a first set of resin panel options displayed through a resin panel customization website hosted at a remote web portal, wherein the selected first option is displayed through the customization website. For example, user 12 accesses website 10 and selects a pull down menu in a customization portion, where the user selection ultimately results in selection of, for example, a textured resin panel.

FIG. 6 also shows that the method from the perspective of user 12 can comprise an act 610 of selecting a second set of options to be positioned adjacent the first set of options. Act 610 includes selecting through the client computer system one of a second set of resin panel options displayed through the customization website, wherein the selected second option is displayed completely behind or in front of the selected first option. For example, a user selects another pull-down menu in the customization website that relates to an image layer selection, and ultimately selects, for example, an interlayer comprising leaves, thatch reed, rocks, etc., or an interlayer (or outer layer) comprising one or more color film layers.

In addition, FIG. 6 shows that the method from the perspective of user 12 can comprise an act 620 of receiving a combined data stream of the options. Act 620 can include receiving rendering information from a remote web portal that reflects a combination of the selected first and second options when displayed. For example, the user's client computer system receives a combined data stream (which may be each time a user makes a selection, or even after receiving all user selections) to be displayed on the website 10. When the combined data stream is rendered and displayed, the website 10 shows precisely how the combined resin panel selections will appear as an ultimate end product.

Furthermore, FIG. 6 shows that the method from the perspective of user 12 can comprise an act 630 of displaying the first and second options overlain together. Act 630 includes displaying one or both of the selected first and second selected options in an at least partially transparent manner, wherein at least a portion of both the first and second selection options are displayed at the same time even though completely overlain together. For example, at least one of the resin panel and/or image layer selections can comprise a transparency image having alpha channels formed therein, so that the other of the images that are hidden behind show through the alpha channels. Alternatively, the pixel values for each pixel address in each first and second image selection are combined to create a set of new combined pixel values. When rendered, the combined pixel address value information provides a similar transparency effect, in that the image layers are viewable through the resin panel layers.

In addition to the foregoing, FIG. 6 shows that a method from the perspective of website 10 (i.e., hosted through a remote web portal) for providing a realistic display of user design choices in a resin panel through a website can comprise an act 640 of receiving a resin panel selection. Act 640 can include receiving from a client computer system one or more user selections through a resin panel customization website regarding one or more resin panel options. For example, the remote web portal sends rendering information for the various initial/landing pages of website 10 to the user's client computer system, and, in response, begins receiving user selections, for example, of one or more textured resin panel substrates to be used in resultant resin panel. In some cases, the resin panel selection can also include various selections with regard to color film layers, as well as gauge, thickness, numbers of resin layers, or other types of components or dimensions.

FIG. 6 also shows that the method from the perspective of website 10 can comprise an act 650 of receiving decorative image layers selections. Act 650 includes receiving from the client computer system one or more user selections through the customization website regarding one or more decorative image layer options that are to be completely overlaid in front of or behind the selected one or more resin panel options. For example, the web portal hosting the website 10 receives one or more selections regarding, for example, choices in decorative interlayer materials, backing materials, or even color film layers, as appropriate. As previously mentioned, these decorative interlayer materials can include a wide range of possible items, including decorative leaves, thatch reed, rocks, various other naturally occurring or synthetic decorative materials, fabrics, photographs, paintings, etc.

In addition, FIG. 6 shows that the method from the perspective of website 10 can comprise an act 660 of processing a combined pixel value for each selection. Act 660 includes processing, at a web portal, a combined data stream that combines pixel values for the one or more resin panel options and for the one or more decorative image layer options, wherein both the one or more decorative object images and the one or more resin panel substrate images are viewable when the combined data stream is displayed. For example, the web portal can create a combined data stream that combines pixels behind alpha channels (as the underlying pixels) and otherwise uses opaque pixel data that is positioned at a forefront of an image. In additional or alternative implementations, the web portal simply multiplies and divides the pixel values, as previously described, at each pixel address for each selected option for the resin panel, and creates a new data stream of RGB values.

Furthermore, FIG. 6 shows that the method from the perspective of website 10 can comprise an act 670 of sending a data stream of the combined pixel data. Act 670 includes sending the combined data stream of the combined pixel values from the web portal to the client computer system for a first display. For example, the web portal processes the user selections as a set of rendering information, and sends the rendering information in a data stream to the user's client computer system. This new data stream can be constructed and sent each time the user makes a new selection, adds to the selections (e.g., selects yet a third, fourth, option, etc.), or otherwise modifies the selection of resin panel materials.

Accordingly, FIGS. 1A-6 provide a number of components, schematics, and mechanisms for providing a user with the ability to create customized resin panels with a great deal of efficiency, accuracy, and reliability in the resulting end-product displayed. One will appreciate that the foregoing can be particularly useful in the creation, design, and ordering or resin-based panel products which can incorporate an almost endless range and/or number of decorative objects (including natural and synthetic interlayer materials, photographs or paintings, silk screens, etc.), levels of color (e.g., via one or multiple color films, fabric layers) and transparency/translucence, and even a wide range of various post processing treatments.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a web portal hosting, in a computerized architectural design environment, one or more resin panel customization websites configured to process one or more user design choices and provide purchase functionality thereof, a method of providing a realistic display of user design choices in a resin panel through a website, comprising the acts of:
   receiving from a client computer system one or more user selections through a resin panel customization website regarding one or more resin panel options;
   receiving from the client computer system one or more user selections through the customization website regarding one or more decorative image layer options that are to be completely overlaid in front of or behind the selected one or more resin panel options;
   processing, at a web portal, a combined data stream that combines pixel values for the one or more selected resin panel options and for the selected one or more decorative image layer options, wherein both the one or more selected decorative object image layer options and the one or more selected resin panel options are viewable when the combined data stream is displayed; and sending the combined data stream of the combined pixel values from the web portal to the client computer system for a first display.

2. The method as recited in claim 1, further comprising identifying one or more pixels of the one or more selected resin panel options that are intended to be transparent prior to processing the combined pixel values.

3. The method as recited in claim 2, further comprising creating one or more alpha channels in an image for each of the one or more pixels to be transparent.

4. The method as recited in claim 3, wherein processing the one or more combined pixel values further comprises:
   using pixel data from a portion of an forefront image in a virtual image stack; and
   using pixel data from a portion of a rearward image in the virtual image stack corresponding to an alpha channel in the forefront image portion.

5. The method as recited in claim 1, wherein processing the one or more combined pixel values further comprises the acts of:
   multiplying RGB values for each pixel in the same address for each layer in a virtual image stack; and
   dividing the multiplied value by 255 for each RGB value to create a new, combined pixel value for each pixel address.

6. The method as recited in claim 5, further comprising generating rendering information corresponding to the processed one or more combined pixel values.

7. The method as recited in claim 1, wherein:
   the selected one or more resin panel options comprise a color film layer; and
   the selected one or more decorate image layer options reflect a choice in a textured resin panel, an etched or screened resin panel, a photograph substrate, or a painting.

8. The method as recited in claim 1, wherein the one or more selected resin panel options comprise a plurality of selected resin panel layers, including at least one textured resin panel layer selected by the user.

9. The method as recited in claim 8, the one or more selected decorative image layer option comprise at least one color film layer that is positioned adjacent at least one of the plurality of resin panel layers, the method further comprising the acts of;
   receiving one or more user selections to change a display orientation of the plurality of resin panel layers and the at least one color film layer; and
   sending a new combined data stream for a second display to the client computer system, wherein the first display and the second display are identical.

10. The method as recited in claim 8, the one or more selected decorative image layer options comprise one or more sets of selected decorative objects to be positioned adjacent at least one of the plurality of resin panel layers, the method further comprising the acts of:
    receiving one or more user selections to change a display orientation of the plurality of resin panel layers and the one or more sets of selected decorative objects; and
    sending a new combined data stream for a second display to the client computer system, wherein the first display and the second display are different based on a change in position of the one or more sets of selected decorative objects relative to the plurality of resin panel layers.

11. At a client computer system in a computerized architectural design environment that includes one or more websites, hosted by one or more remote web portals, to process one or more user design choices and provide purchase functionality thereof, a method of interacting with the one or more websites to design a realistic display of user design choices in a resin panel through the one or more websites, comprising the acts of:
    selecting through a client computer system one of a first set of resin panel options displayed through a resin panel customization website hosted at a remote web portal, wherein the selected first option is displayed through the customization website;
    selecting through the client computer system one of a second set of resin panel options displayed through the customization website, wherein the selected second option is displayed completely behind or in front of the selected first option;
    receiving rendering information from a remote web portal that reflects a combination of the selected first and second options when displayed; and
    displaying one or both of the selected first and second options in an at least partially transparent manner, wherein at least a portion of both the selected first and second options are displayed at the same time even though completely overlain together.

12. The method as recited in claim 11, further comprising an act of selecting through the client computer system one of a third set of options displayed through the customization website, wherein the selected third option is displayed completely behind or in front of the selected first or second option.

13. The method as recited in claim 11, wherein selection of one or both of the first or second options results in the display of a corresponding set of an additional set of sub-options, wherein the selected first or second option represents a user selection of a corresponding sub-option.

14. The method as recited in claim 11, further comprising an act of selecting through the client computer system one or more options to store a profile associated with the selected first and second options, wherein the associated profile is stored at a remote web portal.

15. The method as recited in claim 14, further comprising an act of the client computer system retrieving the stored profile from the remote web portal through the customization website.

16. The method as recited in claim 15, further comprising an act of selecting one or more options to purchase one or more resin panels corresponding to the selected first and second options using the stored profile.

17. The method as recited in claim 11, further comprising the acts of:
adjusting the front or back position of the overlain first and second options relative to the other; and
receiving from a remote web portal a different data stream reflecting the change in front or back position of the selected first and second options.

18. The method as recited in claim 17, wherein:
one of the first or second options comprises a textured resin panel and the other of the first or second options comprises a decorative image layer including one or more decorative objects; and
the different data stream results in a changed display of the selected first and second options.

19. The method as recited in claim 18, wherein:
one of the first or second options comprises a textured resin panel and the other of the first or second options comprises a decorative image layer including a color film; and
the different data stream results in an identical display of the selected first and second options as that displayed prior to the change in positions.

20. At a web portal hosting, in a computerized architectural design environment, one or more resin panel customization websites configured to process one or more user design choices and provide purchase functionality thereof, a computer program storage product having computer-executable instructions stored thereon that, when executed, cause one or more processors in the web portal to perform a method comprising the acts of:
receiving from a client computer system one or more user selections through a resin panel customization website regarding one or more resin panel options;
receiving from the client computer system one or more user selections through the customization website regarding one or more decorative image layer options that are to be completely overlaid in front of or behind the selected one or more resin panel options;
processing, at a web portal, a combined data stream that combines pixel values for the one or more selected resin panel options and for the one or more selected decorative image layer options, wherein both the one or more selected decorative object image layer options and the one or more selected resin panel options are viewable when the combined data stream is displayed; and
sending the combined data stream of the combined pixel values from the web portal to the client computer system for a first display.

* * * * *